United States Patent [19]

Vezard et al.

[11] Patent Number: 5,515,162
[45] Date of Patent: May 7, 1996

[54] LOW NOISE LIGHT SOURCE FOR FORENSIC EXAMINATION

[75] Inventors: Nicolas Vezard, Metuchen; Francis J. Purcell, Westfield, both of N.J.

[73] Assignee: Instruments SA, Inc., Edison, N.J.

[21] Appl. No.: 76,916

[22] Filed: Jun. 14, 1993

Related U.S. Application Data

[63] Continuation-in-part of Ser. No. 904,993, Jun. 26, 1992, abandoned.

[51] Int. Cl.⁶ .............................. G01J 3/18; G01N 21/64
[52] U.S. Cl. ..................... 356/318; 356/334; 250/458.1
[58] Field of Search ..................... 356/317, 318, 356/319, 326, 328, 331, 332, 333, 334; 385/125; 250/458.1, 459.1, 461.1, 461.2; 362/32

[56] References Cited

U.S. PATENT DOCUMENTS

| | | | |
|---|---|---|---|
| 4,099,872 | 7/1978 | White | 356/319 |
| 4,322,807 | 3/1982 | Charman et al. | 356/319 |
| 4,371,263 | 2/1983 | Witte | 356/333 |
| 4,398,823 | 8/1983 | Brown et al. | 356/334 |
| 4,626,684 | 12/1986 | Landa | 250/461.1 |
| 4,747,662 | 5/1988 | Fitz | 385/125 |
| 4,794,260 | 12/1988 | Asano et al. | 250/458.1 |
| 4,933,816 | 6/1990 | Hug et al. | 362/32 |
| 4,973,159 | 11/1990 | Sohma et al. | 356/328 |
| 5,112,127 | 5/1992 | Carrabba et al. | 356/301 |

OTHER PUBLICATIONS

Benner et al, Conference: Fiber Optics Advances in Research and Development, Kingston, R. I., USA (19–23 Jun. 1978) pp. 625–640.
Myrick et al, Applied Optics, vol. 29, No. 9, 20 Mar. 1990, pp. 1333–1344.

*Primary Examiner*—F. L. Evans
*Attorney, Agent, or Firm*—Handal & Morofsky

[57] ABSTRACT

In accordance with the present invention, a low noise light source for illuminating a treated or untreated deposition of material for forensic examination is disclosed. A light having a wide range of wavelengths is generated. The light is directed toward a reflective diffraction grating. The relative position between an exit slit and the grating is repeatedly adjusted to result in passage through the exit slit of different desired bands of wavelengths of output light from portions of the light reflected by the grating. The output light is directed through a filter, toward the deposition to be examined. The filter has a pass characteristic which substantially passes the desired bands and blocks the light that has a wavelength in an expected range of fluorescence of the deposition.

35 Claims, 7 Drawing Sheets

LOW NOISE LIGHT SOURCE FOR FORENSIC EXAMINATION

CROSS REFERENCE TO RELATED APPLICATION

This application is a continuation-in-part of U.S. patent application Ser. No. 904,993 of Purcell, filed on Jun. 26, 1992, now abandoned, the disclosure and drawings of which are hereby incorporated herein by reference.

TECHNICAL FIELD

The present invention relates to a method for the examination of surfaces for fingerprints, blood, hair or other forensic materials for the purpose of developing evidence relating to the past history of the surface.

BACKGROUND

Starting at the end of the nineteenth century, crime fighters began to use and develop what has grown into a substantial body of technological tools designed to detect and/or enhance physical evidence. One of the earliest techniques of this kind to receive widespread application is the dusting of fingerprints. Light sources were also among the first tools used in this field. Hence the classic icon of the gumshoe, flashlight in hand, searching for evidence at the dimly lit crime scene.

When a fingerprint is fresh, the oil which forms the print generally follows the pattern of the fingerprint ridges in the finger which made the print. If a fine dust is applied to the surface of a fresh print, the dust tends to adhere to the oils in the fingerprint, thus forming a pattern which generally reveals the pattern of the fingerprint.

Fingerprint dusts were initially selected for their color contrasting qualities as compared to the background. Thus white dust was used to enhance a fingerprint on a black object and vice versa. Even where the oils of a fingerprint have lost their tackiness due to aging or other phenomena, the amino acids into which they break down do cause a minute etching of many surfaces. While this etching is often not visible to the naked eye, and may not become visible with the application of a colored powder, extremely fine fluorescent dusting powders will reveal the fingerprint pattern when illuminated under high intensity light. Today, many materials, such as dyes, in addition to fluorescent dusting powders are used. Inspection of the evidence is done with specialized light sources. These light sources usually comprise a high intensity source and a filter which passes light having a limited range of wavelengths. Depending upon the material used, which material may be either a fluorescent dusting powder, dye, or other marker material, light having a wavelength which substantially coincides with a known excitation wavelength of the marker is employed. The characteristic of the marker is that, upon illumination with light at one of its excitation wavelengths, it will fluoresce, or emit light. Such fluorescence is typically at a longer wavelength as compared to the excitation wavelength.

Examination of evidence is also enhanced through the use of color filtering glasses or barrier filters, whose color filtering characteristics are tuned to maximize the image to be detected. As noted above, the excitation wavelength is varied through the use of filters at the source. While such devices are very efficient in filtering light, every filter has its own fixed characteristics. These include its center wavelength, bandwidth and transmission coefficient. Thus, if one wishes to have flexibility, it is necessary to have a wide range of filters having different center wavelengths and different bandwidths. This is both cumbersome and expensive. Moreover, as new dyes and powders are introduced, old filters can become obsolete or unnecessary.

In an attempt to provide convenience and flexibility, some light sources used for forensic examination come with a mechanical filter assembly, which allows the introduction of one of about a half dozen filters into the path of the light source to provide the desired wavelength illumination. While this does solve the problem of providing a convenient and easy way to use a light source, obsolescence and limited wavelength and bandwidth selection remain.

In an attempt to overcome some of these disadvantages, earlier forensic illumination systems have attempted to achieve a measure of tunability by mounting an interference filter for angular rotation. Generally, such angular rotation results in a change in angle of incidence with respect to the filter input and a relatively small variation in the encountered path length between the functional layers in the interference filter for light passing through the filter in a fixed direction. In accordance with Bragg's Law, this results in different wavelengths being passed by the filter.

In the above-referenced disclosure of Purcell, a system is disclosed which provided a high intensity light source which is continuously adjustable to vary the center frequency of a band of wavelengths. At the same time, the flexibility of varying the bandwidth of this band was also possible. The same was done with a single light source and a single filtering apparatus. At the same time that was achieved with a mechanical configuration that is both reliable and rugged. Finally, that system was easily portable, and capable of outputting light sufficient for close up analysis of surfaces bearing such material as oils, semen, blood and so forth.

In that system, a method and apparatus for illuminating a deposition of organic material such as, blood, sweat or oil for forensic examination was also provided. A light source emitted light having a range of wavelengths. A first optical coupler or light pipe was positioned and configured to reflect the light toward a reflective diffraction grating. A supportable structure supported, at a selectable relative position, an exit slit and the grating to pass a desired band of wavelengths of output light from portions of the light reflected by the grating. A bendable second optical coupler was coupled to the exit slit and directed the output light toward the deposition to be examined. The bendable second optical coupler comprised a liquid fiber optic member. The support structure rotated the grating. An electronic control and a hand held remote control pad was coupled to the support structure and controlled the support structure.

As can be seen from the above, numerous advantages are provided in such a continuously adjustable diffraction grating based system. Naturally, it is desirable to have the possibility of the highest possible intensity output light at the selected wavelength. However, such a brute force approach results in increased power consumption and excessive heat energy, stressing the rest of the system. In an attempt to achieve better results without aggravating this problem, the above disclosure of Purcell utilizes an IR blocking filter to filter the light source thus allowing only filtered and relatively low intensity light to fall on the grating. This, however, also has an adverse impact on the amount of energy output by the forensic light source, particularly in the UV range. In addition, the use of the filters, because they are exposed to a high intensity source, results in there being another element subject to deterioration and replacement.

SUMMARY OF THE INVENTION

The invention, as claimed, is intended to provide a remedy. It solves the problem of how to provide an improved forensic light source by having a continuously adjustable output wavelength. The light output is capable of generating an image having an improved signal-to-noise ratio. At the same time, this is achieved with long component life while providing the flexibility of also being able to select a conventional filter-based output.

In accordance with the preferred embodiment, this is achieved by using a low noise light source for illuminating a treated or untreated deposition of material for forensic examination. A light having a wide range of wavelengths is generated. The light is directed toward a reflective diffraction grating. The relative position between an exit slit and the grating is repeatedly adjusted resulting in passage of different desired bands of wavelengths of output light from portions of the light reflected by the grating through the exit slit. The output light is directed through a filter, toward the deposition to be examined. The filter has a pass characteristic which substantially passes the desired bands and blocks the light that has a wavelength in an expected range of fluorescence of the deposition.

BRIEF DESCRIPTION OF THE DRAWINGS

One way of carrying out the invention is described in detail below with reference to drawings which illustrate only one specific embodiment of the invention and in which.

BEST MODE FOR CARRYING OUT THE INVENTION

Figure 1:
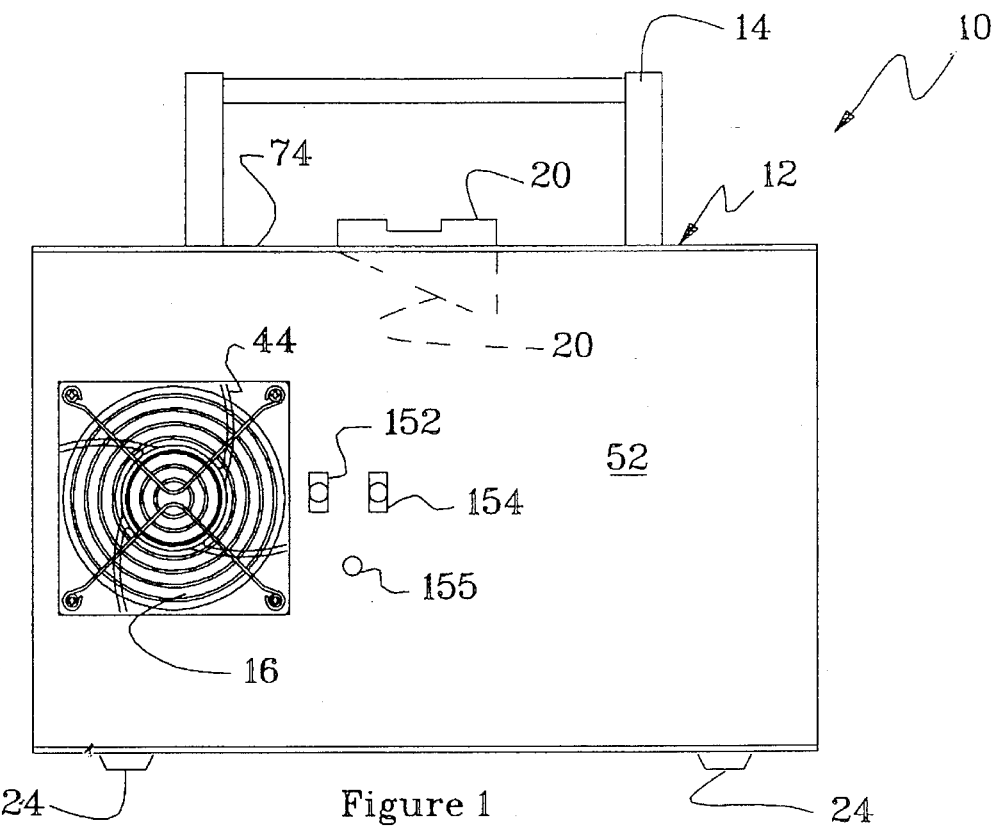
FIG. 1 is a front plan view of a forensic illumination system constructed in accordance with the present invention.
Figure 2:
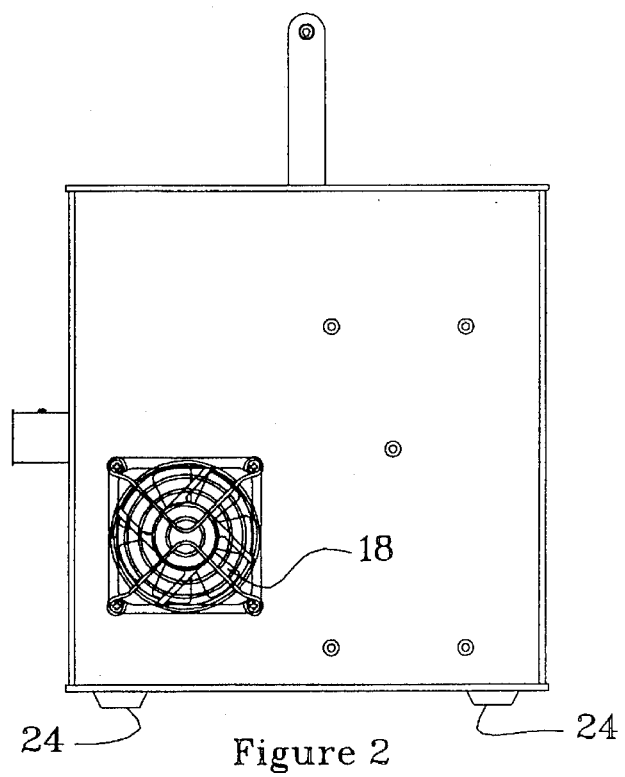
FIG. 2 is a side view of the system illustrated in FIG. 1.
Figure 3:
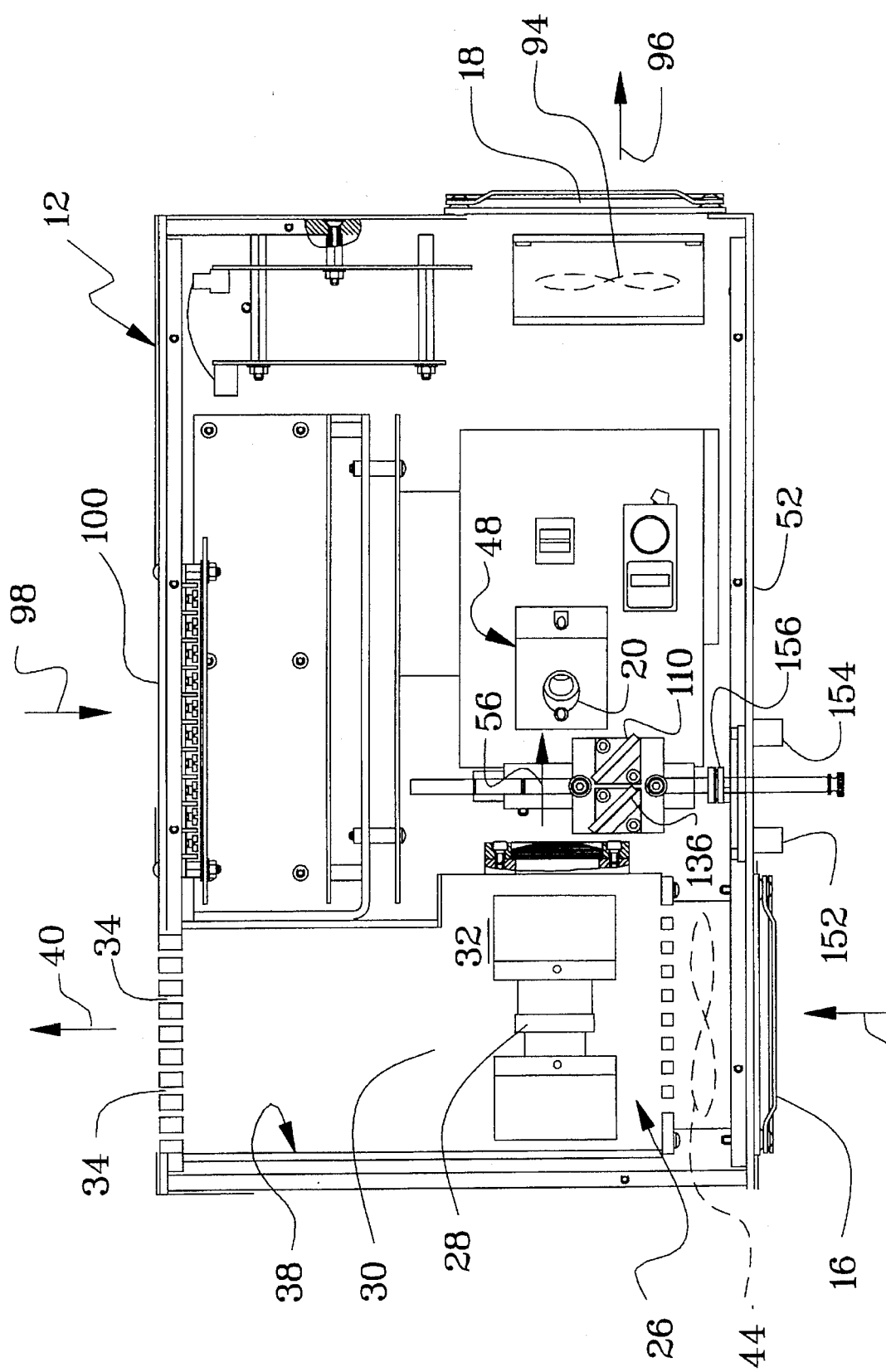
FIG. 3 is top plan view of layout of the components of the system illustrated in FIGS. 1 and 2.

A forensic lighting system 10 constructed in accordance with the present invention is illustrated in FIGS. 1–3. System 10 comprises a housing 12 and a carrying handle 14. Ventilation is provided by a pair of ventilation fan openings 16 and 18.

Figure 4:
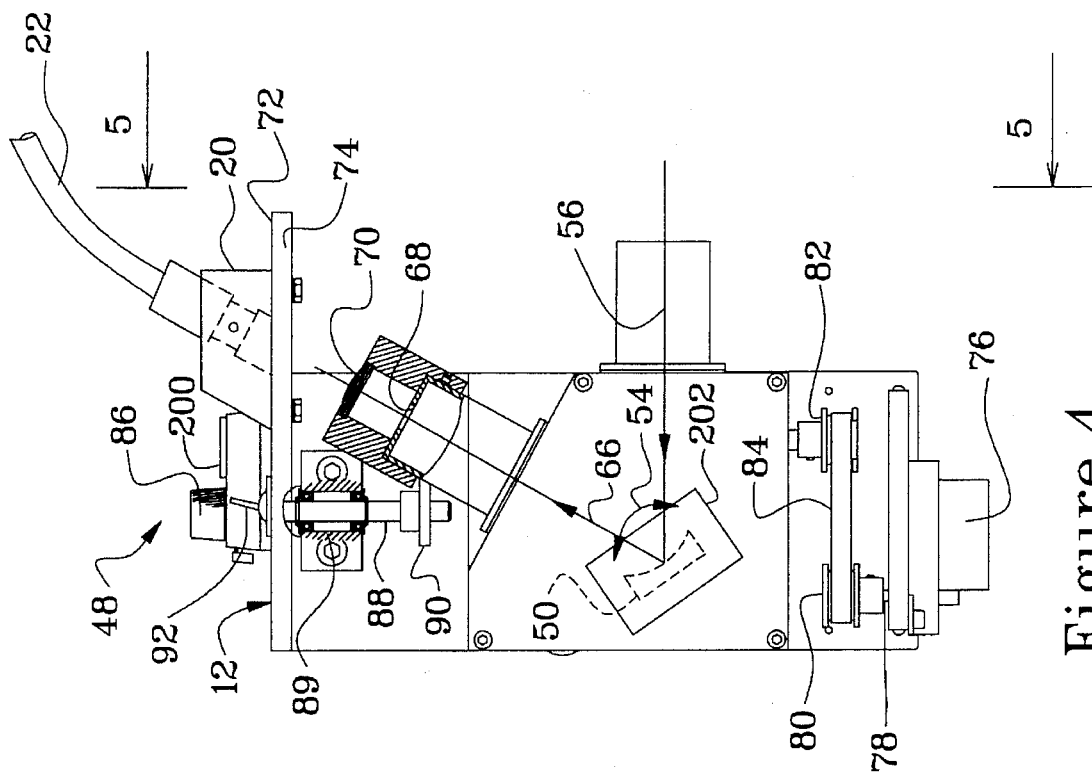
FIG. 4 is rear plan view of a preferred monochromator section of the embodiment of FIGS. 1–3.

Light output from system 10 is provided via a flexible hose-like monochromator light output cable mounting assembly 20 (FIG. 1), which is adopted to mate with the end of a liquid optic coupling cable 22 as illustrated in FIG. 4. Cable 22 is typically two meters long and has a diameter of eight millimeters, and is of known construction. Manipulation of bandwidth and center wavelength is achieved through a remote control box which is coupled to system 10 by a cable such as that described in the above application of Purcell. As can be seen in FIGS. 1–3, the housing, which takes the shape of a rectangular box and is easily portable, is completed by a plurality of rubber feet 24, which serve to support the inventive system 10 while it is in use resting on a floor, table or the like.

With reference to FIG. 3, system 10 generally comprises a light source 26 which comprises an inner light source housing 28, which houses a lamp and reflector. The housing of light source 26 is provided with a ventilation opening 30. The chamber 32 defined by housing 28 of light source 26 communicates with the ambient through ventilation openings 34 to which it is coupled by a pipe 38, shown in cross section. Ambient air is admitted to conduit 38 by ventilation openings 34 causing a flow in the directions indicated by arrows 40 and 42. This air flow is powered by a fan 44. Because this air flow is limited to an isolated space consisting of the insides of pipe 38, chamber 32, and fan 44, any environmental dust or the like entrained by fan 44 is isolated from the rest of the system.

Light source 26 is designed around a conventional 300 Watt xenon short arc lamp. Source 26 is of the type manufactured as a complete subassembly by I L C Technology of Sunnyvale, Calif. under catalog number R300-3. A similar unit is available from O R C Corporation of Freehold, N.J. The light from lamp 50 is focused and concentrated by the combination of a built-in reflector and other standard optics, including a lens 46.

Wavelength selection is provided by a monochromator grating assembly 48, shown in greater detail in FIG. 4. Referring to FIG. 4, monochromator assembly 48 comprises a concave focussing holographic grating 50. Grating 50 has a groove density of 1200 grooves per millimeter and is blazed at 450 nanometers. This grating is replicated in a high temperature epoxy which is deposited on a Pyrex concave substrate. Grating 50 has a radius of curvature of about 112.1 millimeters and a side square dimension of 32 millimeters. This grating is available from Instruments SA, Inc. of Edison, N.J.—USA under part number 524-00.120. Naturally, other gratings may be used, provided that they cover the desired wavelength for the system. To the extent economical, larger gratings are preferred, because they are able to collect more output light.

Figure 5:
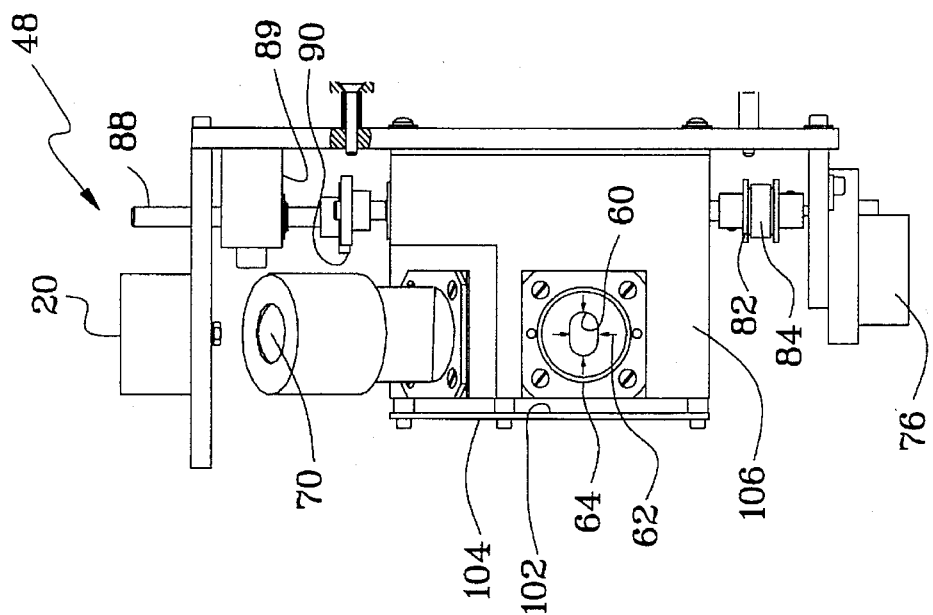
FIG. 5 is a view along lines 5—5 of the monochromator section of FIG. 4.

Grating 50 is positioned within monochromator assembly 48 and oriented to be co-planar with a plane perpendicular to the front face 52 of housing 12. Generally, in order to accommodate different wavelengths, the plane of the grating is maintained perpendicular to front face 52 while being rotated in the directions indicated by arrow 54. Referring to FIGS. 4 and 5, light 56 is input into the system along path 58 in the direction indicated in FIG. 4. Light enters the system through an inlet slit 60, having a height 62 equal to 13 millimeters, and a width 64 of 9 millimeters.

Depending upon the position of grating 50, reflected output light 56 has a wavelength ranging about any desired value within the parameters of grating 50. In the illustrated example, this means a range from a low of 300 nm to a high of 800 nm. Output light 66 passes through outlet slit 68. The dimensions of outlet slit 68 are substantially the same as inlet slit 60. Output light 66 is then passed through a lens 70 which has a diameter of about 1.88 centimeters and a focal length of about 28 millimeters. This results in focussing light toward cable mounting assembly 20 which is mounted on the outside surface 72 of the top plate 74 of housing 12.

Wavelength variation can be achieved through two alternative mechanisms provided in accordance with the present invention. More particularly, referring to FIGS. 4 and 5, automatic wavelength variation is achieved using a stepper motor 76, whose output shaft 78 is coupled to a pulley 80. As the motor is activated, pulley 80 is rotated, resulting in transferring power to a second pulley 82 by means of a coupling belt 84. Pulley 82 drives a rotatable mount upon which grating 50 is mounted, using a mechanism such as that illustrated in U.S. Pat. No. 5,192,981, of Slutter issued Mar. 9, 1993.

As an alternative to the rotation of the grating through the use of stepper motor 76, the grating may be manually rotated by rotation of a knob 86 which is coupled to a shaft 88 and one of the gears 90 of the gear train illustrated in FIGS. 4 and 5. Shaft 88 is mounted within a ball bearing mounting 89.

In the case of automatic wavelength selection, absolute wavelength selection can be achieved by an initial sequence in which stepper motor 76 moves the grating to a known position and then counts from that known position the required number of steps to achieve a desired wavelength. Alternatively, the wavelength indicated by the calibrated counter coupled to knob 86 may be entered into the microprocessor motor control through the remote control key pad. Thereafter, wavelength selection may be made by moving a known number of step displacements from the last known wavelength position. Insofar as the coupling mechanism between pulley 82 and the support for grating 50 linearly varies the output wavelength of light 66 in accordance with the number of steps with which the stepper motor is activated, such relative wavelength calculations are straightforward and the control mechanism is thus simple and reliable.

Figure 13:
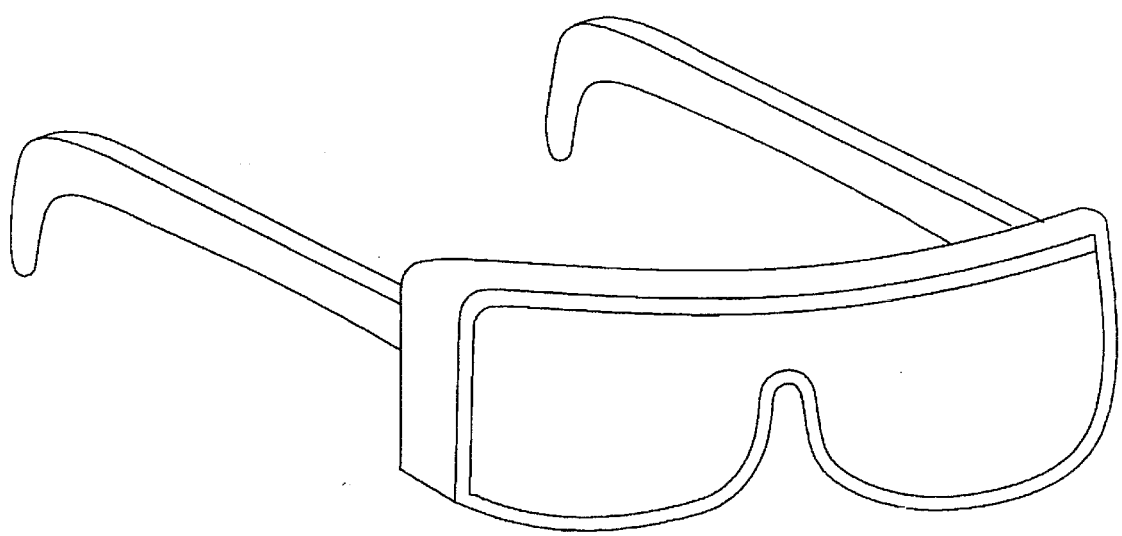
FIG. 13 is a perspective view of filter goggles used in the method and apparatus of the present invention.

In the case of manual selection of wavelength, a switch 92 is used to disconnect power from the automatic drive circuitry for motor 76, thus allowing knob 86 to be rotated to vary wavelength. While the selection of wavelength can be controlled well in this mode, the relative variation of wavelength may be the primary concern, insofar as use in this mode contemplates illumination of a desired deposition with the light output of the monochromator followed by rotation of the knob until a desired image appears, after which the contrast is visually maximized by rotation of knob 86. Typically, photography would then be performed under the wavelength visually determined to result in maximum contrast. In this respect, it is contemplated that a person may use colored goggles (FIG. 13) or look through a camera filter whose color response is substantially matched to that of a filter through which the camera will take a picture of the desired deposition.

The monochromator assembly is cooled by the provision of an exhaust fan 94 (FIG. 3) which exhausts air in the direction indicated by arrow 96. Input air is provided to the system in the direction indicated by arrow 98 through a venting grid 100. The provision of separate isolated air flows for lamp cooling and cooling of the monochromator and other components inside housing 12 results in minimizing the flow of possible entrained particles through the exposed optical components. It is noted that while grating 50, for example, is not directly exposed to the flow of air, a gap 102 between a top plate 104 and the main part of the monochromator subhousing 106 ensures the escape of hot air as is illustrated most clearly in FIG. 5. If desired, one or more sides of the monochromator housing 106 may be removed or made perforated to improve the cooling effect of air input through the vent 100. In addition, vent 100 may be provided with a filter in order to minimize the input of entrained particles from the air.

Figure 6:
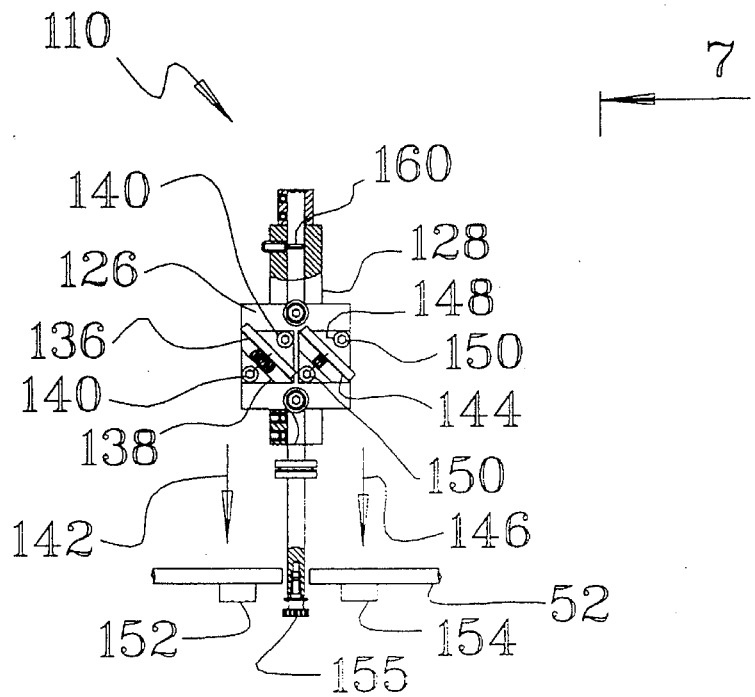
FIG. 6 is a top plan view of a mirror assembly for providing visible and infrared light outputs for the inventive system.
Figure 7:
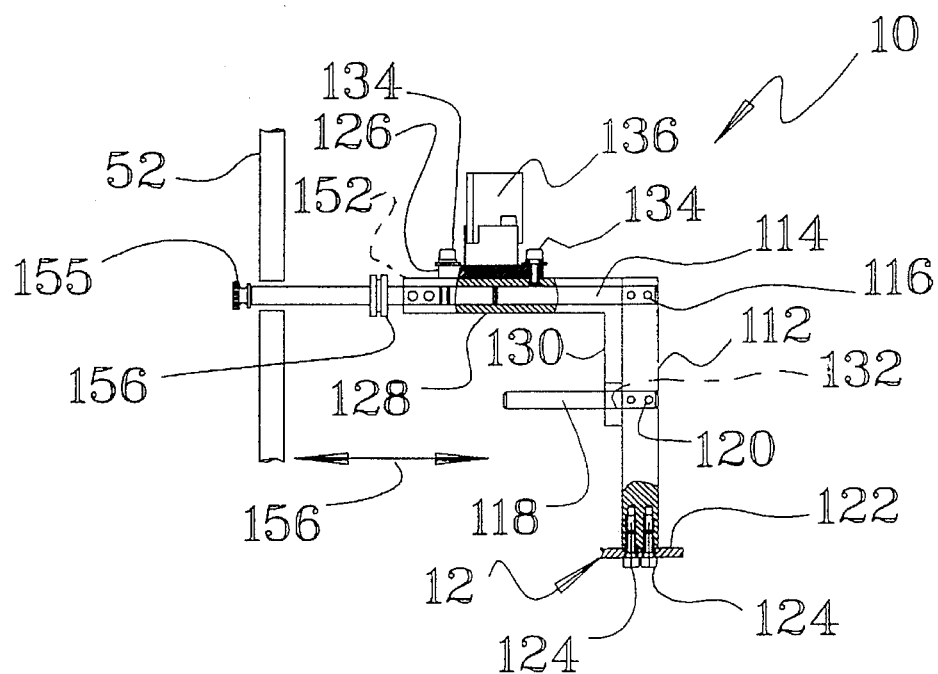
FIG. 7 is a view of the mirror assembly along lines 7—7 of FIG. 6.

As can be seen from the above, means are provided for directly outputting light from light source 26 onto grating 50, for selection of a narrow band of colored light useful for exciting particular materials and allowing for inspection and photography. For some purposes, however, simple infrared or visible light may be desired. Referring to FIGS. 3, 6 and 7, the same can be achieved by introducing a mirror assembly 110 into the space between the lens 46 and inlet slit 60 of the monochromator. This is in contrast to the function of the instrument when in the position illustrated in FIG. 3 where mirror assembly 110 is positioned out of the path between lens 46 and inlet slit 60 of grating assembly 48.

Referring to FIGS. 6 and 7, mirror assembly 110 comprises a support bracket 112 to which a monorail cylindrical bar 114 is secured by a pair of bolts 116. Also secured to support bracket 112 is a key comprising a cylindrical bar 118 which is held in position by a pair of bolts 120. Support bracket 112 is secured to the bottom plate 122 of housing 12 by a pair of bolts 124.

A mirror support plate 126 is mounted on a monorail follower pipe 128 which is slidably mounted on bar 114. A key engagement follower 130 having a hole 132 is rigidly secured to pipe 128 in order to provide for a rotational stability of pipe 128 and the mirror support plate 126 secured thereto by bolts 134.

As can be seen with particular reference to FIGS. 3 and 6, an infrared reflecting mirror 136 is mounted on plate 126 by a mirror mounting bracket 138 which is secured to plate 126 by bolts 140. Infrared reflecting mirror 136 reflects infrared light incident on it as indicated by light 56 in the direction indicated by arrow 142.

While infrared light is reflected by mirror 136 in the direction indicated by arrow 142, visible light continues through mirror 136 and is caused to fall in the same direction upon mirror 144. Mirror 144 is a simple silvered surface which reflects all wavelengths of visible light incident on it, causing the light to proceed in the direction indicated by arrow 146. As can be seen in FIG. 6, mirror 144 is mounted on a bracket 148 which is secured by bolts 150 to plate 126.

As can be seen particularly with reference to FIG. 7, pipe 128 is secured to an operator arm 152 which has a manual gripping knob 154 and a stop 156 mounted on it.

In the position illustrated in FIGS. 6 and 7, infrared and visible light are provided along the paths indicated by arrows 142 and 146. This causes light to fall upon infrared output port 152 which receives infrared light reflected by mirror 136. At the same time, visible light is reflected along the path indicated by arrow 146 to visible light output port 154 also located on the front face 52 of housing 12.

If one is not desirous of obtaining infrared or visible light and wishes, instead to obtain the output of the monochromator at a particular narrow band of wavelengths, knob 154 is pulled forward bringing the mirror assembly from the position illustrated in FIGS. 6 and 7 to the position illustrated in FIG. 3. Movement of the mirror assembly in the directions indicated by arrow 156 is achieved because pipe 128 is slidably mounted for such movement on bar 114. Movement is limited by stop 156 which, in the furthest forward position, butts against front face 52 of housing 12, as illustrated in FIG. 3. At the same time, follower 130 slides along bar or key 118 which passes through hole 132. The rearward position of the mirror assembly illustrated in FIG. 6 is maintained by a plunger ball assembly 158 which mates with an annular detente groove 160 in bar 114. A groove may also be provided for the frontmost position of the mirror assembly.

Figure 8:
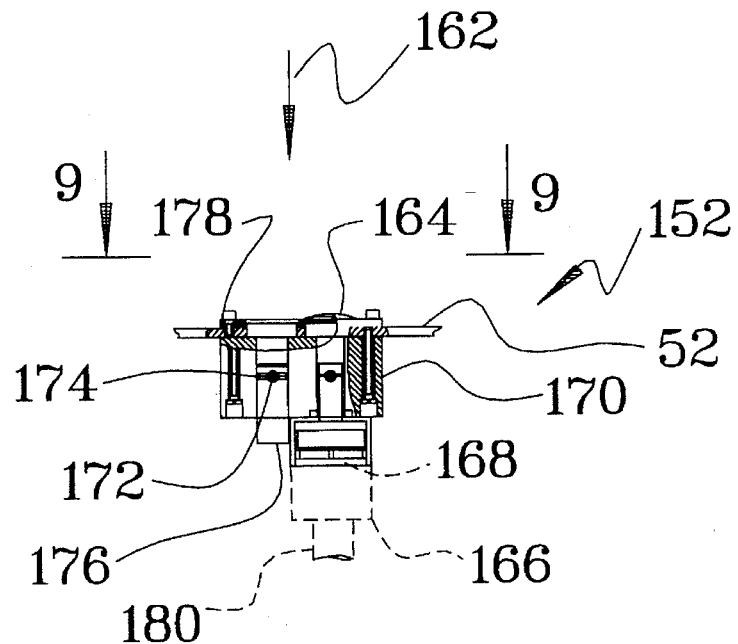
FIG. 8 is a view in cross-section of the output light port of the inventive system.
Figure 9:
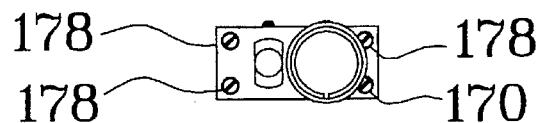
FIG. 9 is a view along lines 9—9 of FIG. 8.
Figure 10:
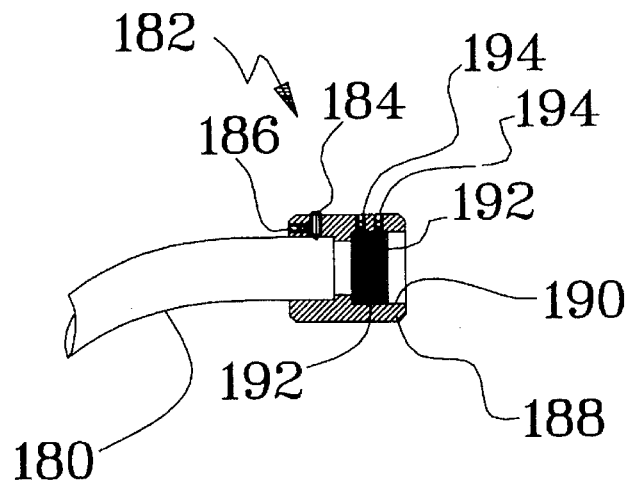
FIG. 10 is a view of the output port and filter holder of the light output cable of the inventive system.

The construction of ports 152 and 154 is illustrated in FIGS. 8, 9 and 10. Light 162 falling on the fiber mount assembly port 152 is focussed by a lens 164 for coupling to a fiber optic member 166 illustrated by phantom lines in FIG. 8. Fiber optic member 166 includes a fiber optic receiving port 168 which mounts in locator assembly 170. A positive engagement between fiber optic member 166 and locator assembly 170 is provided by a ball and plunger assembly 172 which engages an annular groove 174 on a locking rod 176 which is a part of the conventional fiber optic light guide used. The locator assembly 170 is secured to the front face 52 of housing 12 by a pair of bolts 178. Fiber optic member 166 includes an elongated fiber optic coupling cable 180.

As illustrated in FIG. 10, at the other end of fiber optic cable 180 is an output coupling filter holder assembly 182 which includes a ball and plunger assembly 184 for maintaining the fiber optic cable 180 in position. The ball and plunger assembly provides for the mounting of filters. The coupling filter holder assembly 182 includes a substantially cylindrical housing 188 which is formed with a bore 190 which may receive one or two filters 192 which may be held in position by set screws 194 or any other suitable means. Filters may be changed by simply removing one assembly 182 and replacing it with another having a filter of desired characteristics, such as those detailed below. In addition, two such filters may be used at the same time to obtain sharper skirt characteristics, sharper cut-off and higher blocking in the band reject region on the order of $10^{-9}$.

In use, the inventive system functions as a versatile and effective light source. It has all of the advantages of prior art filter based systems and a monochromator based output of superior quality. In particular, with the mirror assembly 110 located in the position illustrated in FIG. 3, the light output of the 300 watt xenon source 26 falls directly on grating 50 causing the selective release through outlet slit 68 of a narrow band of wavelengths. The upper and lower limits of the light output from the system and thus the color of the output light may be varied by rotation of knob 86. Knob 86 is also coupled to a counter 200, which is of the type well known and widely available on the market and sold by such companies as Veeder Root. Counter 200 is coupled to knob 86 which in turn is coupled by a series of gears to a rotatably mounted grating support 202 through the sine wave characteristic coupling mechanism described in U.S. Pat. No. 5,192,981 of Slutter.

Linear rotation of knob 86, coupled by such a coupling mechanism results in a linear variation in wavelength output by the system. Such linear wavelength variation is extremely precise and thus allows the counter to directly read the wavelength in nanometers, for example, with the gear reduction ratio selected for a one-to-one correlation in a 0–999 mechanical counter, for example. Thus, once the position of the grating is adjusted to correspond to the number on the counter, the counter is an extremely accurate and reliable indicator of output wavelength for the monochromator.

Likewise, the gear train between stepper motor 76 and the grating support may be adjusted for a gearing ratio which corresponds to a one-to-one correspondence between output wavelength in nanometers and a single step of the stepper motor.

Insofar as all mechanical gear train systems include a certain amount of backlash, accurate wavelength indications in both the automatic stepper motor mode or in the manual mode may be achieved by always stopping at the desired wavelength when the system is moving in one direction or the other, for example, when the system is moving in the direction of increasing wavelength. If one is increasing wavelength, it is thus is merely necessary that the system be adjusted until the desired wavelength is reached. However, if one is decreasing wavelength, the procedure followed in both the automatic and manual modes is to reduce wavelength to a value slightly below, for example 5 nanometers below, the desired wavelength and then reverse the direction of dial movement or motor movement and approach the desired wavelength from a smaller wavelength.

As noted above, fingerprint detection and related detection of smears of organic or inorganic materials may be done using a wide of variety of techniques ranging from direct detection of the substance under intense light of a particular color, white light, or the like. Where the characteristics of the system are known, the user may select the desired wavelength from the monochromator using the automatic motorized mode or he may do the same using knob 86.

As an alternative, the system may be controlled using a conventional electronic microprocessor based system to scan through a desired range of wavelengths and stop at desired increments of wavelength for any desired period of time. Such operation may be automatically or manually repeated. Such automatic repeats of a scan may be used when one wishes to repeatedly check different areas for deposits. Such wavelength scans are of particular value where an area has the possibility of numerous emissions of unknown characteristics. A crime scene may be the subject of undisturbed detection with one simply looking for materials which may fluoresce when excited with light of an unknown wavelength. For example, the perpetrator of a crime may have visited a site where a particular material was located and such material may be contained on the soles of his shoes or on his hands and remnants of that material may be left behind. These remnants can often be detected by generally scanning a wide range of wavelengths in a wide range of places at the crime scene.

Because of the automatic nature of repeated scans at a wide range of wavelengths, which scans can be repeated quickly and efficiently, a wide range of new search operations become possible and practical using the inventive system.

With the monochromator assembly of the present invention, it is contemplated that wavelength scans and outputs will be limited to the ultraviolet and visible ranges. Thus, a liquid light waveguide member is appropriate. It is also possible that if one wishes to perform searching in the infrared range, to use a fiber optic light guide, or no waveguide at all.

Detection of weak emissions may be compounded by the presence of noise in the output light, that is to say the presence of light at wavelengths other than the desired wavelength. To address this problem, in accordance with the present invention, filtering is provided for the lamp output in the monochromator mode. More particularly, broad band or low pass filters, at the output which may cover a wide range of output wavelengths in a particular scanning operation, are provided for the flexible fiber optic bundle liquid optic tube through snap-on filter assembly 182. The positioning of these filter assemblies at the output of the optical wave guide cable is important because only a narrow range of wavelengths are passed through the filter along with the noise one desires to remove and only a very small amount of the undesired wavelengths are contained in the noise. Accordingly, the fluorescing of the filter itself is minimized and this has the effect of introducing yet another improvement in the quality of the monochromator forensic light source output.

In addition, by selecting a low pass filter which passes light of the desired wavelength but carefully avoids passing light having a wavelength at which the material which one wishes to detect fluoresces, yet further improvements in signal to noise ratio can be achieved.

Complementing the above strategy for generating light of a particular wavelength or wavelengths for the purpose of causing a desired fluorescent or other emission, viewing or photography of the detected image can usually be improved as compared to naked eye detection through the use of an appropriate filtering strategy. This strategy may take the form of the use of colored goggles by the user or, in the case of photography, a colored filter on a camera where photography of the image is desired. Use of two cascaded filters at the source, or at the viewer or camera eye improves signal-to-noise ratio.

Such camera filters and goggles are usually orange or red insofar as excitation wavelengths in most systems used today are in the blue and neighboring regions of the spectrum while fluorescence emissions are in the orange and red regions of the spectrum. Of course, in principle, depending upon the particular chemical system being used to develop or mark the deposition to be detected, it is possible to use camera filters or goggles in the blue range while exciting at other, or perhaps somewhat theoretically even the same, wavelength range.

When it is desired to photograph a particular deposition, one peaks the intensity of the emission using the knob or the electronic wavelength adjustment to vary wavelength. Typically, this is done wearing colored glass goggles or similar products made of plastic. One then matches the filter characteristics of the goggles for the purpose of photography. If desired, a number of camera filters having characteristics close to that of the goggles may be tried by visually looking at the deposition through them to see which gives the best contrast. The thus selected filter is then placed on the camera and an exposure taken through the filter, typically using a black and white film and a color film to be sure the best quality photograph has been obtained.

In some cases, however, it is desired to obtain a color photograph of the particular deposit of material. The inventive system's monochromator light output may be used with color film. However, the possibility also exists, if desired, in making a photograph of the deposit, having once found a deposit and identified a wavelength at which its visibility is enhanced to use a filter, and the visible or IR outputs of the system. Such filtering systems can be used positioned either in front of the lamp, or at the end of the light guide, or at any position in between and may take the form of a conventional filter wheel or a filter cartridge.

When it is desired to use infrared light, either filtered or unfiltered, the user simply grasps knob 55 and pushes it in all the way into the housing of the light source, thus displacing the mirror assembly 110 from the position shown in FIG. 3 to the position shown in FIG. 6. In this configuration, light 56 output from the source 26 is caused to fall upon mirror 136 and infrared radiation is reflected by mirror 136 toward output port mounting 152. This light may be used directly as a wide cone or, if desired, a fiber optic cable may be coupled to mounting 152 to couple light to any desired point. It is noted that a fiber optic cable is required because infrared radiation is not effectively coupled by a liquid optic and the greater expense and more delicate physical condition of the fiber optic cable, as compared to the liquid light guide, must be tolerated.

When the mirror assembly is in the position illustrated in FIG. 6, the visible light which is not reflected by mirror 136 is passed by that mirror to mirror 144 which reflects it toward output light port 154 on the front of the inventive forensic light source 10. This visible light, like the infrared output from the infrared source may be filtered at any point, for example directly at the output port for a filtered wide cone of light, if filtering is desired with the wide cone of light, or by filtering at the end of a optic wave guide, which, because port 154 outputs visible light, may be the less expensive and more rugged liquid optic wave guide.

In accordance with the present invention, it has been discovered that the automatic scanning operation possible with the automated system of the present invention may be implemented with particular advantage using certain combinations of filters at the light source and at the viewer's eyes in the form of goggles or other equivalent means.

Figure 11:
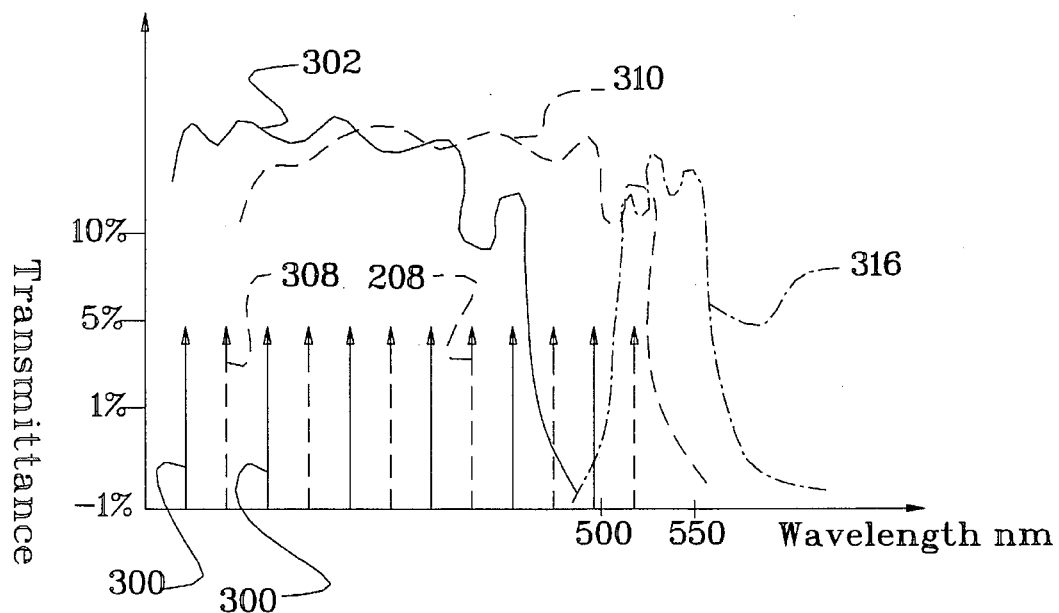
FIG. 11 is a graph illustrating output energies and band pass characteristics for using the inventive system.
Figure 12:
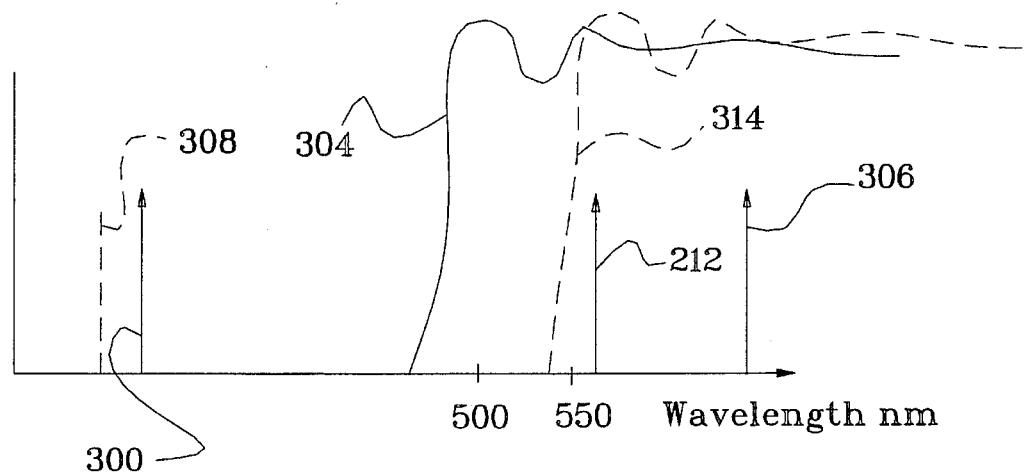
FIG. 12 is a graph illustrating fluorescent energies and detector band pass characteristics.

In accordance with the present invention, the monochromator output may be scanned through a range of wavelengths 300 as illustrated in FIG. 11, all of shorter wavelength than the 500 nm cut off wavelength of a short wave pass filter, such as a Corion LS500 which has a characteristic 302, which is used to filter the output of the monochromator. By simultaneously using a pair of orange goggles or an orange filter having the characteristic 304, one may see any of the emitted wavelengths 306 as illustrated in FIG. 12. Alternatively, a range of wavelengths 308 can be scanned and passed through a 550 nm short wave pass filter, such as a Corion LS550, which has a characteristic 310. One then detects the emitted light 312 which is viewed through a red filter with a characteristic 314. In both of these cases, the short wave pass filters are put at the output end of the light conducting cable and thus minimally fluoresce, while at the same time the combination of filter and monochromator substantially reduce background source noise.

In similar fashion, a 550 nm band pass filter with a bandwidth of 40 nm (characteristic 316) cascaded with a 550 band pass filter with a bandwidth of 25 nm to filter the white light output can be used with red goggles. Naturally, the white light output and the infra-red output can also be used in the manner of conventional sources.

While an illustrative embodiment of the invention has been described above, it is, of course, understood that various modifications will be apparent to those of ordinary skill in the art. Such modifications are within the spirit and scope of the invention, which is limited and defined only by the appended claims.

I claim:

1. A method of illuminating a treated or untreated deposition of material for forensic examination, comprising the steps of:

(a) generating light having a wide range of wavelengths;

(b) directing said light toward a reflective diffraction grating;

(c) repeatedly scanning through a range of output light bandpass wavelengths by adjusting the relative position between an exit slit and said grating to result in passage through said exit slit of different desired bands of wavelengths of output light from portions of said light reflected by said grating; and (d) directing the scanned wavelength output light through a filter, having a pass characteristic which substantially passes the desired bands and blocks light having a wavelength in an expected range of fluorescence of the deposition, toward said deposition to be examined.

2. A method as in claim 1, wherein said direction of output light is achieved through the use of a flexible optic waveguide with an input end coupled to said exit slit and an output end which is oriented to illuminate said deposition.

3. A method as in claim 2, wherein said filter is attached to said output end.

4. A method as in claim 3, wherein said flexible optic waveguide comprises a liquid optic member.

5. A method as in claim 4, wherein said adjustment of the relative positions of said exit slit with respect to said grating is achieved by rotation of said grating.

6. A method as in claim 1, wherein said adjustment of the relative positions of said exit slit with respect to said grating is achieved by rotation of said grating.

7. A method as in claim 1 wherein said movement is controlled by an electronic control and a hand held remote control pad.

8. A method as in claim 1 further comprising the step of detecting fluorescence of said deposition through an emission filter.

9. A method as in claim 8 wherein a long pass filter is used as said emission filter.

10. Apparatus for illuminating a deposition of material and causing it to fluoresce for forensic examination, comprising:

(a) a light source emitting light having a range of wavelengths;

(b) a reflective diffraction grating formed in high temperature epoxy and positioned to receive light from said light source;

(c) a first optical coupler, coupled to said light source, positioned and configured to couple said light to said reflective diffraction grating;

(d) an exit slit;

(e) support structure supporting said optical coupler, grating and exit slit to continuously scan through a plurality of selectable relative positions to pass through said slit a desired band of wavelengths of output light from portions of said light reflected by said grating; and (f) a filter positioned to receive said output light and allow a portion thereof to pass through said filter, said filter having a band characteristic substantially passing said desired band and rejecting light at wavelengths of expected fluorescence of the deposition.

11. Apparatus in claim 10, further comprising:

(g) a bendable second optical coupler coupled to said exit slit and directing said output light through an output end toward said deposition to be examined.

12. Apparatus as in claim 11, wherein said bendable second optical coupler comprises a fiber optic member.

13. Apparatus as in claim 12, wherein said optic member comprises a liquid optic member.

14. Apparatus as in claim 10, wherein said support structure comprises a rotatable support for rotatably supporting said grating.

15. Apparatus as in claim 10, further comprising an electronic control and a hand held remote control pad coupled to said support structure and controlling said support structure.

16. Apparatus as in claim 15, wherein said pad has a number of preset wavelength selections.

17. Apparatus as in claim 8, wherein said exit slit may be varied in width to select a number of different bandpass widths.

18. Apparatus as in claim 11, wherein said bendable second optical coupler is a flexible light guide and said filter is a short pass filter with a cut off wavelength of 500 nm or 550 nm with at least $10^{-8}$ blocking in the fluorescence range, said filter being mounted at the end of said flexible light guide.

19. Apparatus as in claim 11, wherein said filter located at said output is a short pass filter.

20. Apparatus as in claim 11, wherein said filter is located at said output end and comprises a pair of band pass filter members arrayed in cascade.

21. Apparatus as in claim 20, wherein said band pass filter members have substantially the same center wavelength and different bandwidths.

22. Apparatus as in claim 10, further comprising a filter for filtering light from said light source before it falls on said grating.

23. Apparatus as in claim 10, further comprising a viewing filter for receiving light from said deposition, said viewing filter having a pass characteristic which results in passage of light at an expected emission wavelength.

24. Apparatus as in claim 10 wherein fluorescence of said deposition is detected through an emission filter.

25. Apparatus as in claim 24 wherein said emission filter is a long pass filter.

26. A method of illuminating a deposition of material whose location is unknown for forensic examination, comprising the steps of:

(a) generating light having a wide range of wavelengths;

(b) directing said light toward a wavelength selecting member;

(c) repeatedly scanning said wavelength selecting member through a range of output light wavelengths by adjusting the relative position between an exit port and said wavelength selecting member to result in passage through said exit port of different desired bands of wavelengths of output light from portions of said light output by said wavelength selecting member; and (d) directing the scanned wavelength output light through a filter, having a pass characteristic which substantially passes the desired bands and blocks light having a wavelength in an expected range of fluorescence of said deposition and directing the scanned filtered wavelength output light toward a plurality of sites in order to detect and illuminate said deposition to be examined.

27. A method as in claim 26 further comprising the step of detecting fluorescence of said deposition through an emission filter.

28. A method as in claim 27 wherein a long pass filter is used as said emission filter.

29. Apparatus for illuminating a deposition of material and causing it to fluoresce for forensic examination, comprising:

(a) a light source emitting light having a range of wavelengths;

(b) a wavelength selecting member formed in high temperature epoxy and positioned to receive light from said light source;

(c) a first optical coupler, coupled to said light source, positioned and configured to couple said light to said wavelength selecting member;

(d) an exit port;

(e) support structure supporting said optical coupler, wavelength selecting member, and exit port to continuously scan through a plurality of selectable relative positions to pass through said port a desired band of wavelengths of output light form portions of said light output by said wavelength selecting member; and (f) a filter positioned to receive said light from said light source and allow a portion thereof to pass through said filter and fall on said wavelength selecting member, said filter having a pass characteristic substantially passing said desired band and rejecting light at other wavelengths to minimize the generation and transmission of noise in the apparatus.

30. Apparatus as in claim 29 wherein fluorescence of said deposition is detected through an emission filter.

31. Apparatus as in claim 30 wherein said emission filter is a long pass filter.

32. Apparatus for illuminating a deposition of material and causing it to fluoresce for forensic examination, comprising:

(a) a light source emitting light having a range of wavelengths;

(b) a wavelength selecting element formed in light temperature epoxy and positioned to received light from said light source;

(c) a first optical coupler, coupled to said light source, positioned and configured to couple said light to said wavelength selecting member;

(d) an exit port;

(e) support structure movably supporting said optical coupler, wavelength selecting member and exit port to select one of a plurality of selectable relative positions to pass through said port a desired band of wavelengths of output light from portions of said light output by said wavelength selecting member; and (f) a filter positioned to receive said output light and allow a portion thereof to pass through said filter, said filter having a pass characteristic substantially passing said desired band and rejecting light at wavelengths of expected fluorescence of the deposition.

33. Apparatus as in claim 32, wherein fluorescence of said deposition is detected through an emission filter.

34. Apparatus as in claim 33 wherein said emission filter is a long pass filter.

35. Apparatus as in claim 34, wherein said emission filter comprises a pair of goggles.

\* \* \* \* \*